United States Patent
Cannata et al.

(10) Patent No.: US 12,388,635 B2
(45) Date of Patent: *Aug. 12, 2025

(54) SYSTEMS, METHODS, AND MEDIA FOR GENERATING AND USING A MULTI-SIGNATURE TOKEN FOR ELECTRONIC COMMUNICATION VALIDATION

(71) Applicant: FMR LLC, Boston, MA (US)

(72) Inventors: Robert Cannata, Hingham, MA (US); Arun Nadger, Cumberland, RI (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,093

(22) Filed: Mar. 6, 2024

(65) Prior Publication Data

US 2024/0421987 A1    Dec. 19, 2024

Related U.S. Application Data

(63) Continuation of application No. 18/209,743, filed on Jun. 14, 2023, now Pat. No. 11,962,691.

(51) Int. Cl.
*H04L 9/08* (2006.01)
*H04L 9/32* (2006.01)

(52) U.S. Cl.
CPC .......... *H04L 9/0866* (2013.01); *H04L 9/0825* (2013.01); *H04L 9/3252* (2013.01)

(58) Field of Classification Search
CPC .... H04L 9/0866; H04L 9/0875; H04L 9/3252
See application file for complete search history.

(56) References Cited

U.S. PATENT DOCUMENTS

| | | | |
|---|---|---|---|
| 9,942,048 B2 | 4/2018 | Oberheide et al. | |
| 2006/0291664 A1* | 12/2006 | Suarez | H04L 9/3263 380/286 |
| 2016/0078235 A1* | 3/2016 | Morita | G06F 21/604 726/1 |
| 2018/0337904 A1* | 11/2018 | Letourneau | H04L 9/0866 |
| 2019/0278509 A1* | 9/2019 | Suryanarayana | G06F 3/0688 |
| 2020/0050798 A1* | 2/2020 | Jiang | H04L 9/3247 |
| 2020/0279258 A1* | 9/2020 | Agrawal | G06Q 20/3829 |
| 2022/0021528 A1* | 1/2022 | Dawson, III | H04L 9/3236 |
| 2022/0244932 A1* | 8/2022 | Lapiduz | H04L 9/3247 |
| 2022/0374535 A1* | 11/2022 | Jagasia | G06F 21/604 |
| 2023/0120616 A1* | 4/2023 | Preimesberger | H04L 9/3247 713/171 |
| 2024/0256700 A1* | 8/2024 | Sirohi | G06F 16/2379 |

* cited by examiner

*Primary Examiner* — Darshan I Dhruv
(74) *Attorney, Agent, or Firm* — Cesari and McKenna, LLP

(57) ABSTRACT

Techniques are provided for generating and using a multi-signature token for electronic message validation according to the one or more embodiments as described herein. Specifically, a multi-signature token may be generated that includes at least two digital signatures and information (e.g., user information). Each of the at least two digital signatures may be generated using a private key of at least two key pairs that are maintained on a plurality of keystores that have at least two different implementations (e.g., security protocols). If the at least two digital signatures are valid, the multi-signature token may be determined to be valid and the client request may optionally be performed. If at least one of the at least two digital signatures is invalid, the client request is optionally not performed.

20 Claims, 4 Drawing Sheets

SYSTEMS, METHODS, AND MEDIA FOR GENERATING AND USING A MULTI-SIGNATURE TOKEN FOR ELECTRONIC COMMUNICATION VALIDATION

CROSS-REFERENCE TO RELATED APPLICATIONS

The present application is a continuation of commonly assigned copending U.S. patent application Ser. No. 18/209,743, which was filed on Jun. 14, 2023, by Robert Cannata et al., for SYSTEMS, METHODS, AND MEDIA FOR GENERATING AND USING A MULTI-SIGNATURE TOKEN FOR ELECTRONIC COMMUNICATION VALIDATION, which is hereby incorporated by reference.

BACKGROUND

Technical Field

The present disclosure relates generally to electronic signatures, and more specifically to techniques for generating and using a multi-signature token for electronic communication validation.

Background Information

A digital signature is a mathematical scheme for verifying the authenticity of digital messages or documents. A valid digital signature, where the prerequisites are satisfied, gives a recipient high confidence that the message was created by a known and authorized sender and that the message was not altered in transit.

Digital signatures employ asymmetric cryptography. Asymmetric cryptography is the field in which cryptographic systems use pairs of related keys. Each key pair consists of a public key and a corresponding private key. The key pairs are typically generated with cryptographic algorithms based on mathematical problems termed one-way functions. Security of public-key cryptography depends on keeping the private keys secret; while the public keys can be openly distributed without compromising security.

However, in the age of ever more powerful computers and knowledge about cryptographic concepts, digital signatures are becoming more vulnerable to attacks (e.g., cyber-criminals).

For example, a cyber-attack may involve the hijacking of a digital signature, which is used within an enterprise system, by unlawfully obtaining the private key that is used to create the digital signature. This can be done through a variety of means. For example, such means may include, but are not limited to, stealing the key from the legitimate owner, obtaining it through a phishing attack or other social engineering tactic, or exploiting a vulnerability in the software or hardware used to generate and store the private key.

Once armed with the private key, cyber attackers can forge digital signatures and exploit an enterprise's system and resources. Not only does this harm trust in the enterprise and their security practices, but such an attack will require the key pairs to be revoked and re-issued which consumes time, money, and processing resources of the enterprise.

As such, what is needed is a digital signature schema that provides better protection against cyber-attacks and vulnerabilities.

SUMMARY

Techniques are provided for generating and using a multi-signature token for electronic message validation according to the one or more embodiments as described herein. As will be described in further detail below, a plurality of keystores having at least two different implementations may generate and maintain one or more private/public key pairs. In an embodiment, an implementation is a security technique, tool, and/or keystore product used to protect the private/public key pairs at a particular keystore.

A plurality of private keys, based on the at least two implementations, can be utilized to generate a plurality of digital signatures that can be included in a multi-signature token. The multi-signature token provides additional security when compared to conventional digital signature techniques.

In an embodiment, a client device may issue a request to an enterprise system over a computer network. The client request may be a financial services request. A security gateway may intercept the request and provide information (e.g., user information) to an authorization service module. The authorization service module may obtain a at least two private keys from a plurality of different keystores having at least two implementations. The authorization service module may generate a plurality of digital signatures by applying the at least two private keys to the information. The authorization service module may generate a multi-signature token that includes the plurality of digital signatures and the information. The multi-signature token may be transmitted to the security gateway.

In an embodiment, the security gateway may transmit the multi-signature token with the client request to a target service module. The target service module may use the public keys that correspond to the private keys used to generate the digital signatures in the multi-signature token. Specifically, the target service module may apply each public key to a corresponding digital signature of the multi-signature token to generate a plurality of validation values. If each validation value correlates to the information in the multi-signature token, the target service module determines that the multi-signature token is valid. In response to determining that the multi-signature token is valid, the target service module may optionally perform the client request.

If at least one validation value does not correlate to the information in the multi-signature token, the target service module determines that the multi-signature token is invalid. In response to determining that the multi-signature token is invalid, the target service module may optionally deny performance of the client request.

BRIEF DESCRIPTION OF THE DRA WINGS

The description below refers to the accompanying drawings, of which:

DETAILED DESCRIPTION OF AN ILLUSTRATIVE EMBODIMENT

Figure 1:
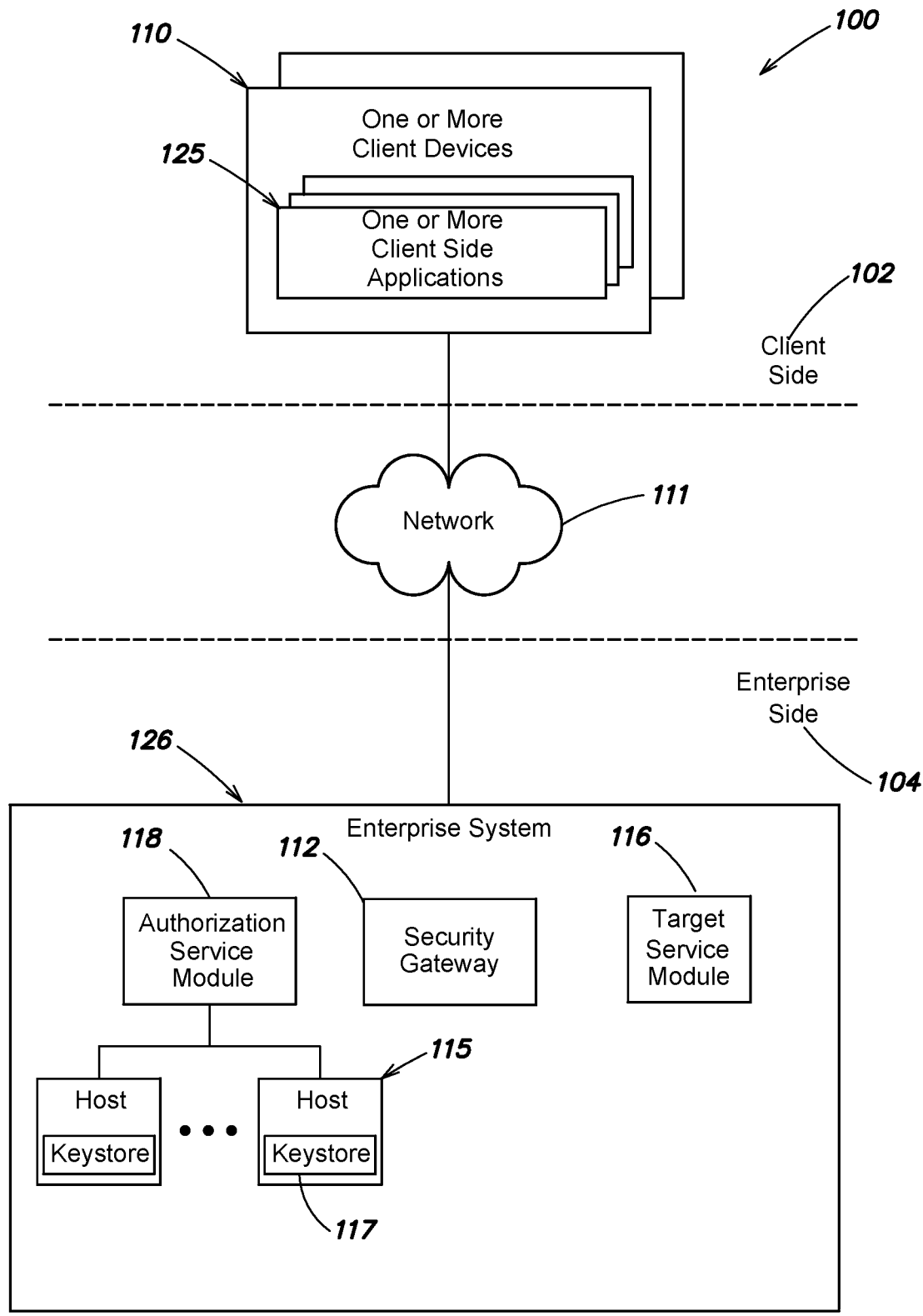
FIG. 1 is a high-level block diagram of an example system environment for generating and using a multi-signature token for electronic message validation.

FIG. 1 is a high-level block diagram of an example system environment 100 for generating and using a multi-signature token for electronic message validation according to one or more embodiments as described herein. The system environment 100 may be divided into a client side 102 that includes one or more local client devices 110 that are local to end users, and an enterprise side 104 that includes enterprise system 126 that is remote to the end users. Enterprise side 104 may be managed, operated, and maintained by an enterprise. In an embodiment, the enterprise of enterprise side may be a financial services institution.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of the enterprise. Client device 110 may also be operated by authorized personnel, e.g., employees of the enterprise, to perform enterprise functions. For example, client device 110 may download and execute application 125 that is provided by the enterprise. The execution of application 125 may allow customers and/or employees of the enterprise to implement one or more financial services functions.

The client device 110 may communicate with the enterprise system 126, managed/operated by the enterprise, over network 111. For example, a user may utilize application 125, executing on client device 110, to perform one or more functions at enterprise system 126 as will be described in further detail below. In an embodiment, the network 111 may be a zero-trust network.

Enterprise system 126 of enterprise side 104 may implement the one or more embodiments as described herein. As depicted in FIG. 1, enterprise system 126 may include security gateway 112, target service module 116, authorization service module 118, and a plurality of keystores 117 each of which may execute on a different host 115.

The security gateway 112, target service module 116, plurality of keystores 117 executing on respective hosts 115, and authorization service module 118 may operate to generate and utilize a multi-signature token for electronic message validation as will be described in further detail below. The use of the term "signature" is for simplicity and ease of understanding, and it is expressly contemplated that "signature" as used herein is an "electronic signature" or "digital signature."

Security gateway 112 may intercept requests, e.g., financial services requests, issued by client devices 110 over network 111 that are directed to enterprise system 126. In an embodiment, and as will be described in further detail below, the security gateway 112 may intercept a request from client device 110 and issue a command to the authorization service module 118 to generate a multi-signature token according to the one or more embodiments as described herein. Additionally, and as will be described in further detail below, the security gateway 112 may transmit the generated multi-signature token with the request to target service module 116.

In an embodiment, security gateway 112 may provide any of a variety of different security services for enterprise system 126. For example, the security gateway 112 may evaluate requests from client devices 110 against one or more different policies defined by the enterprise to ensure malicious requests are blocked from accessing enterprise system 126 and utilizing its functions/services.

The enterprise system 126 includes a plurality of keystores 117 (i.e., key services), each of which may execute on a different host 115. Ellipses are included between the two hosts 115 in FIG. 1 to indicate that the enterprise system 126 can include any number of keystores 117, each with a corresponding host 115, that is equal to or greater than two. In an embodiment, a host 115 may be any of a variety of different types of computing devices.

Each of the plurality of keystores 117 may generate and store one or more private/public key pairs (hereinafter "key pairs"). For example, a processor (not shown) of a particular host 115 may execute a corresponding keystore 117 to implement a key generation algorithm that generates one or more key pairs that are maintained on the keystore 117. The key generation algorithm may be one of a Digital Signature Algorithm (DSA), an Elliptic Curve Digital Signature Algorithm (ECDSA), an Edwards-curve Digital Signature Algorithm (EdDSA), a Rivest-Shamir-Adleman (RSA) algorithm, an ELGamal signature scheme, or a Schnorr signature algorithm. Although example key generation algorithms are provided, it is expressly contemplated that any of a variety of different key generation algorithms may be utilized according to the one or more embodiments as described herein. Each key pair may be known as an asymmetric key pair. For simplicity and ease of understanding, reference number 117 may be used to refer to a keystore, a plurality of keystores, at least two keystores, a first keystore, a second keystore, etc.

In an embodiment, at least two keystores of the plurality of keystores 117 have different implementations. In an embodiment, "different implementations" may mean that the at least two keystores 117 and/or the hosts 115 executing each of the at least two keystores 117 use different security techniques, keystore products, or tools (e.g., encryption techniques, firewalls, etc.) to protect the privacy and security of at least the private keys of the generated key pairs.

As an illustrative example, let it be assumed that the plurality of keystores 117 includes a first keystore and a second keystore. The recitation of first and second as used herein is not meant to indicate a temporal relationship. Instead, the recitation of first and second is used to distinguish or differentiate the first keystore from the second keystore in the example described herein.

For this example, let it be assumed that the first keystore uses a particular encryption algorithm to protect the private keys of the key pairs that are generated and maintained at the first keystore. According to the one or more embodiments as described herein, the second keystore uses a different encryption algorithm, a different type of security tool (e.g., firewall), or keystore product to protect the private keys of the key pairs generated and maintained at the second keystore.

As will be described in further detail below, the at least two private keys, maintained at different keystores that have at least two different implementations, can be used to generate a multi-signature token according to the one or more embodiments as described herein.

The public keys of the key pairs that are respectively maintained at the first and second keystores may be shared and distributed with, for example, other software and/or devices on enterprise side 104 and/or client side 102. As will be described in further detail below, the public keys of the key pairs may be used with the generated multi-signature token to determine if an electronic communication is from an authentic and authorized source according to the one or more embodiments as described herein. Stated another way, the public keys of the key pairs can be used with the generated multi-signature token to determine the validity of the electronic communication.

The enterprise system 126 also includes authorization service module 118 as depicted in FIG. 1. The authorization service module 118 may manage and access the plurality of keystores 117. In an embodiment, only the authorization service module 118 of enterprise system 126 may be capable of accessing and managing the plurality of keystores 117. As such, client devices 110, target service module 116, and security gateway do not have access to the plurality of keystores 117.

In an embodiment, and as will be described in further detail below, the authorization service module 118 may receive a request with corresponding information (e.g., user information) from security gateway 112. In response, the authorization service module 118 may access at least two of the keystores 117. Based on the accessing, the authorization service module 118 may obtain at least two selected private keys maintained on different keystores 117 that have different implementations. The authorization service module 118 may use the at least two selected private keys with the corresponding information (e.g., user information) to generate a plurality of digital signatures. As will be described in further detail below with reference to FIG. 2, the authorization service module 118 may generate a multi-signature token that includes at least the plurality of digital signatures and corresponding information.

Advantageously, the multi-signature token that is generated utilizing at least two private keys based on different implementations cannot be forged if, for example, a single keystore is compromised (e.g., hacked or unlawfully accessed). As such, the one or more embodiments as described herein provide an improvement in the existing technological field of electronic signatures when compared to conventional systems that typically use a single private key, of a single key pair from a single keystore, to generate a digital signature.

Because of the added security provided by the multi-signature token when compared to digital signatures generated by conventional systems, the one or more embodiments as described here are not required to re-issue key pairs as frequently as conventional systems. As a result, the one or more embodiments as described herein conserve processing resources when compared to conventional systems. As such, the one or more embodiments as described herein provide an improvement to the computer, e.g., enterprise system 126, itself.

The enterprise system 126 further includes target service module 116 as depicted in FIG. 1. As will be described in further detail below, the target service module 116 may receive at least the generated multi-signature token and electronic communication that includes, for example, a request (e.g., client request). As will be described in further detail below, the target service module 116 may use at least two selected public keys, that correspond to selected private keys used to generate the digital signatures of the multi-signature token, to determine if the electronic communication is valid. In an embodiment, an electronic communication is valid if it is determined to be authentic and from an authorized source (e.g., a customer and/or employee of the enterprise).

If the target service module 116 determines that the electronic communication is valid, the target service module 116 may perform the request that is associated with the electronic communication. If the target service module 116 determines that the electronic communication is invalid, the target service module 116 may deny performance of the request.

Each of security gateway 112, target service module 116, keystore 117, and authorization service module 118 may be hardware, software, or a combination of hardware and software. Further, although FIG. 1 depicts security gateway 112, target service module 116, and authorization service module 118 being separate and distinct entities in FIG. 1, it is expressly contemplated that one or more entities may be combined to implement the different features according to the one or more embodiments as described herein.

Each computing device (e.g., one or more local client devices 110 enterprise system 126, and each host 115) may include processors, memory/storage, a display screen, and/or other hardware (not shown) for executing software, storing data, and/or displaying information.

Figure 2:
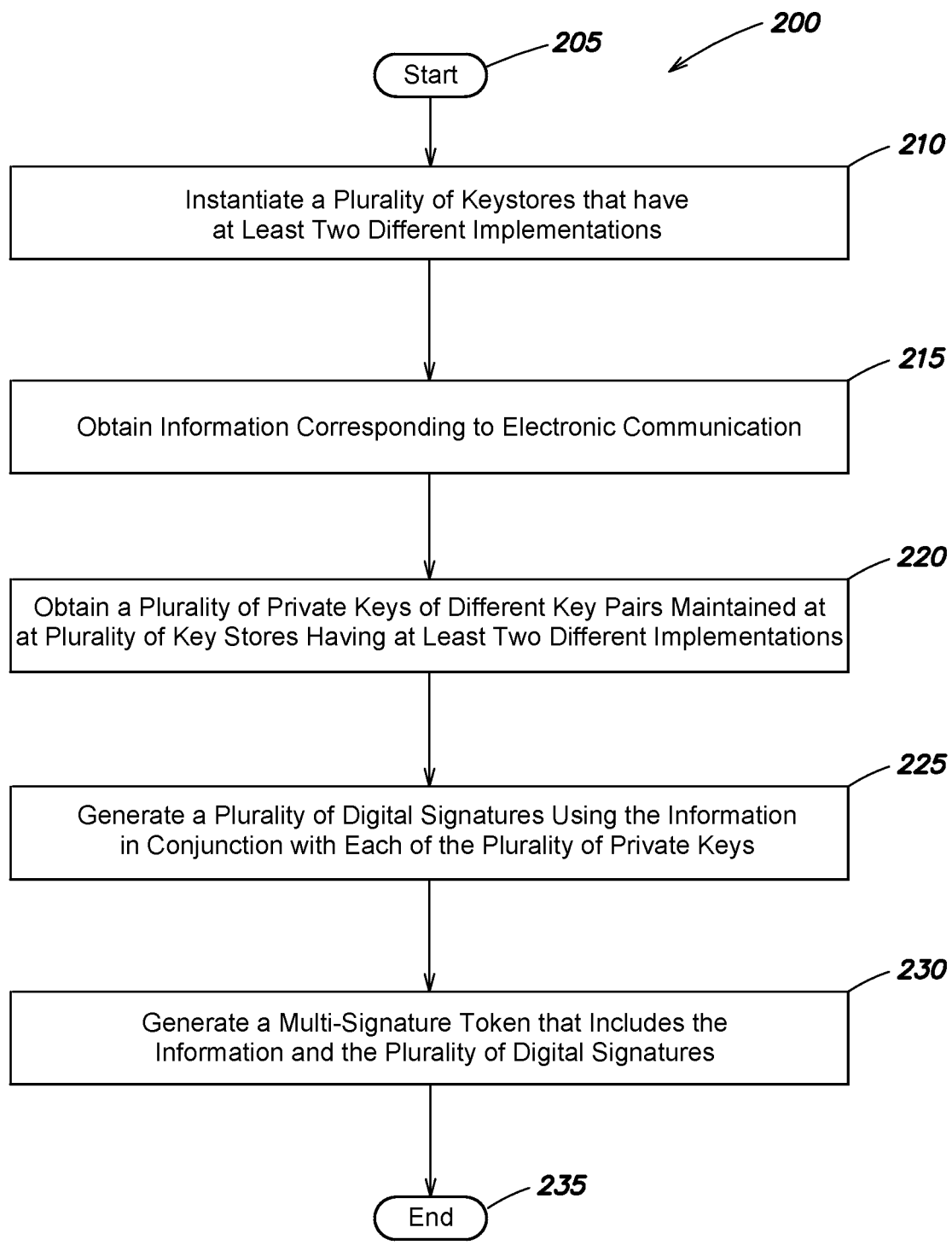
FIG. 2 is a flow diagram of a sequence of steps for generating a multi-signature token according to the one or more embodiments as described herein.

FIG. 2 is a flow diagram of a sequence of steps for generating a multi-signature token according to the one or more embodiments as described herein. The procedure 200 starts at step 205 and continues to step 210 where a plurality of keystores 117, having at least two different implementations, are instantiated. In an embodiment, each of the plurality of keystores 117 may execute on a different host 115.

In an embodiment, the authorization service module 118 may manage and operate the plurality of keystores 117. As such, the authorization service module 118 may initiate the instantiation of each of the plurality of keystores 117. For example, the authorization service module 118 may issue an instantiation request to each host 115 to initiate the instantiation of each keystore of the plurality of keystores 117.

In an embodiment, the authorization service module 118 is the only entity that has access to the plurality of keystores 117. As such, security gateway 112, target service module 116, and client devices 110 do not have access to keystores 117. Accordingly, security gateway 112, target service module 118, and client devices 110 do not have access to the private keys of the key pairs maintained at each of the plurality of keystores 117. The authorization service module 118 may distribute and share the public keys of the keypairs maintained at each of the plurality of keystores 117. As such, security gateway 112, target service module 116, and client devices 110 may have access to the public keys of the keypairs maintained at each of the plurality of keystores 117.

As part of the instantiation process, each of the plurality of keystores 117 may execute a key generation algorithm to generate one or more key pairs. The key generation algorithms may be executed at one or more predefined times, on a predetermined schedule, or on-demand.

Additionally, and as part of the instantiation process, each of the plurality of keystores 117 may initiate the use of an implementation to protect the privacy and security of the key pairs. Specifically, an implementation at a particular keystore 117 may protect the private keys, of the key pairs maintained at the particular keystore 117, that is only accessible to the authorization service module 118. In an embodiment, at least two keystores of the plurality of keystores 117 have different implementations.

For example, when the plurality of keystores 117 includes two keystores, each of the two keystores has a different implementation according to the one or more embodiments as described herein.

As another example, let it be assumed that the plurality of keystores includes six keystores. According to the one or more embodiments as described herein, at least two of the six keystores have different implementations. For example, five of the six keystores may use the same implementation to protect the privacy and security of their respective key pairs. In this example, let it be assumed that each of the five keystores use an encryption tool named "Alpha Key Security Tool" to protect the privacy and security of their respective key pairs. Because the five keystores have the same implementation, the sixth keystore must have a different implementation. For example, let it be assumed that the six keystore uses an encryption tool named "Beta Key Security Tool" to protect the privacy and security of the key pairs maintained at the sixth keystore.

As another example, let it be assumed three keystores of the six keystores have the same implementation, e.g., Alpha Key Security Tool. The other three keystores may have the same implementation that is different from the other implementation, e.g., Beta Key Security Tool. As an even further example, each of the six keystores may have different implementations. Therefore, and for each of the illustrative examples, at least two keystores of the plurality of keystores 117 have different implementations.

After the plurality of keystores 117 with at least two different implementations are instantiated, the procedure continues from step 210 to step 215. At step 215, the authorization service module 118 obtains information corresponding to an electronic communication directed to enterprise system 126. The electronic communication may be or include a client request. The client request may be a request to implement a financial services function at enterprise system 126. In an embodiment, the obtained information may be user information corresponding to a user that issues the electronic communication to the enterprise system 126 using, for example, client device 110.

In an embodiment, the user information may include, but is not limited to, a user identifier of a user, a business context of the user, resource information indicating one or more resources (e.g., particular files, folders, devices, storage, etc.) that can be accessed by the user.

For example, a user identifier may be a unique username or identifier assigned to a customer after the customer has, for example, completed a registration process with the enterprise system 126. The user identifier may also be a unique username or identifier assigned to an employee of the enterprise that has access to enterprise system 126.

The business context of a user may be a role, rights, and/or privileges that a user has in relation to the enterprise system 126. Specifically, different customers and/or employees of an enterprise may have different rights and/or privileges. The business context for the user may be the rights and/or privileges that are provided by the enterprise to the user.

As an example, let it be assumed that the enterprise that manages and operates enterprise system 126 is a financial services institution. As such, different customers of the financial services institution may have different financial services privileges. For example, certain customers may have the privilege to buy and sell stocks that are less than or equal to a threshold value (e.g., dollar amount), while other customers may have privileges to buy and sell stocks that are of any value. Even more, certain customers may have the privilege to execute certain types of financial services actions (e.g., short selling) that may not be afforded or provided to other customers.

As another example, consider that different employees of the financial services institute may have different rights and privileges based on their role at the financial services institute. For example, an analyst of the financial services institute may have rights/privileges to access investment information, while an executive of the financial services institute may have a larger set of privileges that includes management services (e.g., viewing employee financial compensation).

The provided examples of different business contexts for users of a financial services institute are for illustrative purposes only, and it is expressly contemplated that each user may have any of a variety of different contexts based on the way an enterprise defines contexts for different users.

In an embodiment, the information (e.g., user information) may be a string of one or more alphanumeric characters that, for example, define the user information. For this example, let it be assumed that the information received by authorization service module 118 corresponds to Customer Jane Doe who has buy and sell privileges for stocks of all values. Based on Jane Doe's name and privileges, let it be assumed that the information for this example is "JDoe12-AllBuySellPrivleges".

In an embodiment, the information may be received from security gateway 112 that intercepts a request from client device 110 operated by the user, e.g., Jane Doe. For example, Jane Doe may use client device 110 to issue a buy stock request over network 111 to enterprise system 126. In response to issuing the request, the security gateway 112 may intercept the request and corresponding user information and transmit the user information, e.g., JDoe12-AllBuySellPrivleges, to the authorization service module 118. In an embodiment, the security gateway 112 may transmit the user information to the authorization service module 118 with a multi-signature token generation request.

The procedure continues to step 220 and the authorization service module 118 obtains a plurality of private keys of different key pairs that are maintained at a plurality of keystores having at least two different implementations. For this example, a first keystore 117 stores a plurality of key pairs and has an implementation of Alpha Key Security Tool. Additionally, a second keystore 117 stores a plurality of different key pairs and has an implementation of Beta Key Security Tool.

Therefore, and in this example, the authorization service module 118 obtains a private key of a key pair stored on the first keystore that is protected using the Alpha Key Security Tool. The authorization service module 118 also obtains a different private key of a different key pair stored on the second keystore that is protected using the Beta Key Security tool. For this example, let it be assumed that the private key obtained from the first keystore is PrivateKey1. Further, let it be assumed that the different private key obtained from the second keystore is PrivateKey2.

The procedure continues to step 225 and the authorization service module 118 generates a plurality of digital signatures using the information (e.g., user information) in conjunction with each of the private keys obtained from the keystores 117 having at least two different implementations. For this example, the authorization service module 118 applies PrivateKey1 to user information JDoe12-AllBuySellPrivleges to generate a first digital signature. Additionally, the authorization service module 118 applies PrivateKey2 to user information JDoe12-AllBuySellPrivleges to generate a second digital signature.

In an embodiment, the authorization service module 118 may use a selected hash algorithm, of any of a variety of different hash algorithms, to generate a hash value. The authorization service module 118 may then encrypt the hash value using the private key to generate a digital signature. In an embodiment, applying a private key to the information includes the generation of a hash value from the information and then encrypting the hash value using a private key. For this example, the authorization service module 118 may apply PrivateKey1 to JDoe12-AllBuySellPrivleges by encrypting the hash value using PrivateKey1 to generate the first digital signature. The authorization service module 118 may apply PrivateKey2 to JDoe12-AllBuySellPrivleges by encrypting the hash value using PrivateKey2 to generate the second digital signature.

The procedure continues to step 230 and the authorization service module 118 generates a multi-signature token. In an embodiment, the authorization service module 118 generates the multi-signature token as a combination of the information obtained in step 220 and the plurality of digital signatures generated in step 225. Therefore, and in this example, the multi-signature token includes (1) the first digital signature, (2) the second digital signature, and (3) user information JDoe12-AllBuySellPrivleges.

Therefore, and to forge or compromise a multi-signature token that is generated according to the one or more embodiments as described herein, a cyber-attacker would need to unlawfully obtain the at least two different private keys, e.g., PrivateKey1 and PrivateKey2, from the at least two keystores 117 that have different implementations.

For example, the cyber-attacker would have to unlawfully infiltrate the at least two different keystores 117 that are protected using different implementations. Therefore, a cyber-attacker would have to hack into two different and distinct security protocols (e.g., Alpha Key Security Tool and Beta Key Security Tool) to unlawfully obtain the two different private keys to forge or compromise the multi-signature token according to the one or more embodiments as described herein.

If a cyber-attacker is able to infiltrate a single keystore that has a particular implementation, the multi-signature token is still secure because the other digital signature that is included in the multi-signature token is based on a private key that is generated at a keystore with a different implementation that was not infiltrated by the cyber-attacker.

As such, the multi-signature token generated according to the one or more embodiments as described herein adds additional security and protection when compared to conventional systems that use a single private key, of a key pair, for a digital signature. Specifically, a cyber-attacker is only required to infiltrate the security protocol of a single implementation to forge or compromise a conventional digital signature, while the cyber-attacker would have to infiltrate two different and distinct security protocols to forge or compromise the multi-signature token according to the one or more embodiments as described herein.

As another example, consider a multi-signature token with three digital signatures that is generated according to the one or more embodiments as described herein. To forge or compromise this multi-signature token, a cyber-attacker may have to unlawfully infiltrate the three different keystores that are protected using three different implementations. Therefore, a cyber-attacker would have to hack into three different and distinct security protocols to unlawfully obtain the three different private keys.

Therefore, each digital signature, which is based on a different implementation, provides an additional level of security and protection for the multi-signature token that is generated according to the one or more embodiments as described herein. Accordingly, the one or more embodiments as described herein provide an improvement to the existing technological field of electronic communication security/protection when compared to conventional techniques that may attempt to protect an electronic communication using a single private key from a keystore having only a single implementation.

Because of the additional protection provided by the multi-signature token, the one or more embodiments as described herein do not require the additional resources (e.g., processing resources) that are required by conventional systems that have to more frequently re-issue key pairs when private keys using a single implementation are compromised. Because the additional resources (e.g., processing resources) are not required to re-issue key pairs, the one or more embodiments as described herein provide an improvement to the computer, e.g., enterprise system, itself.

After generating the multi-signature token at step 230, the procedure 200 ends at step 235.

According to the one or more embodiments as described herein, the multi-signature token can be used to validate an electronic communication. Specifically, the multi-signature token can be used to determine if the electronic communication is authentic and from an authorized user.

Figure 3:
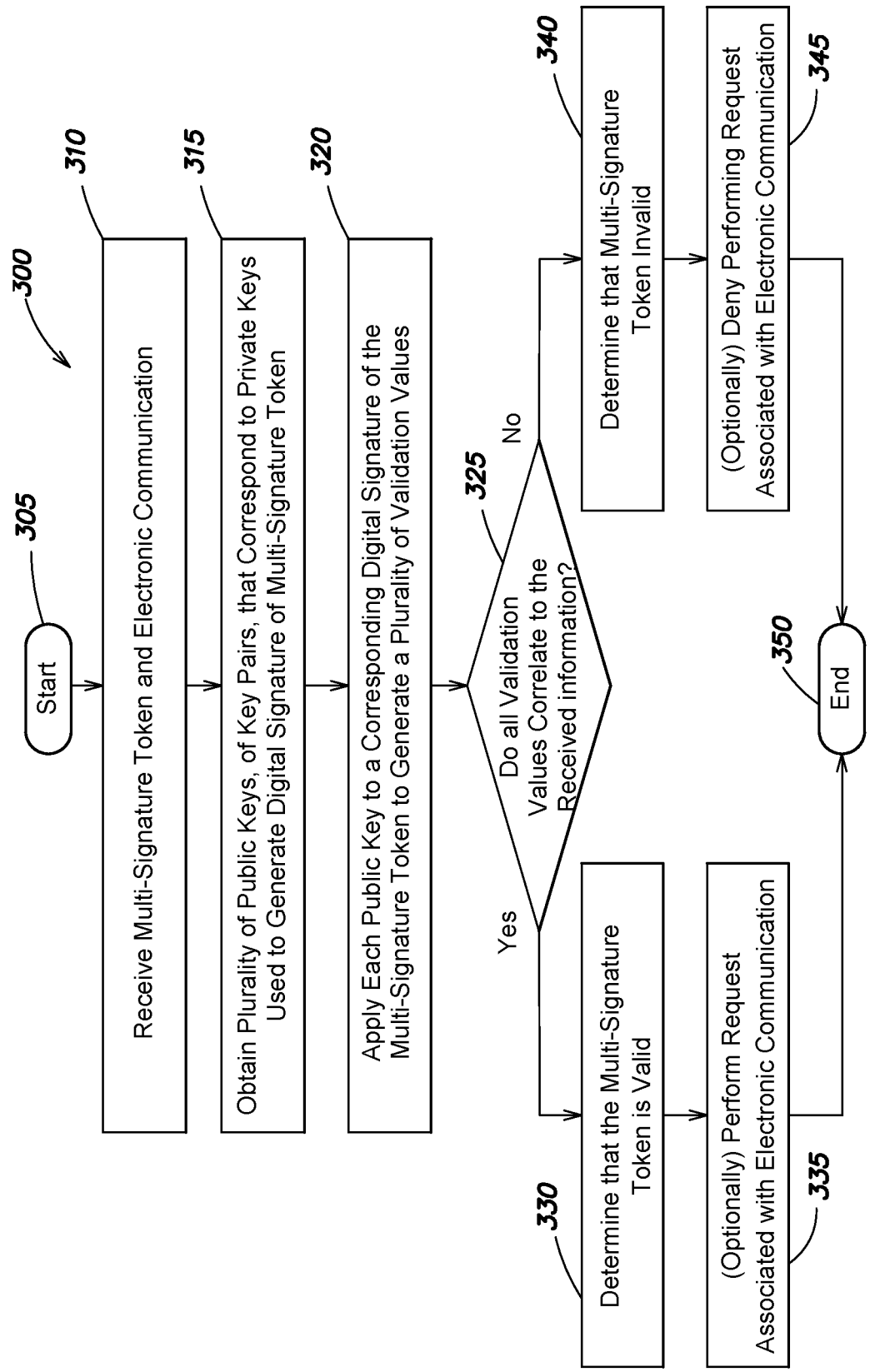
FIG. 3 is a flow diagram of a sequence of steps for using a multi-signature token to validate an electronic communication according to the one or more embodiments as described herein.

FIG. 3 is a flow diagram of a sequence of steps for using a multi-signature token to validate an electronic communication according to the one or more embodiments as described herein. Procedure 300 starts at step 305 and continues to step 310 where a target service module 116 receives a multi-signature token and an electronic communication. For this example, let it be assumed that the target service module 116 obtains the multi-signature token that is generated as described in relation to FIG. 2. As such, the multi-signature token includes (1) the first digital signature generated using PrivateKey1, (2) the second digital signature generated using PrivateKey2, and (3) user information JDoe12-AllBuySellPrivleges.

In an embodiment, the electronic communication may be or include a client request. For example, the client request may be issued by a user, e.g., Jane Doe, using client device 110 and the client request may be directed to enterprise system 126 over network 111.

The procedure continues to step 315 and the target service module 116 obtains a plurality of public keys, of key pairs, which correspond to the private keys used to generate the plurality of digital signatures of the multi-signature token. For this example, the first digital signature is generated using PrivateKey1 and the second digital signature is generated using PrivateKey2. Further, and as explained above, the authorization service module 118 may share and distribute the public keys of the key pairs.

In this example, let it be assumed that PrivateKey1 is part of a key pair that includes public key PublicKey1 that is maintained at the first keystore. Similarly, let it be assumed that PrivateKey2 is part of a key pair that includes public key PublicKey2 that is maintained at the second keystore. As such, the authorization service module 118 may distribute PublicKey1 and PublicKey2 to the target service module 116. In an embodiment, the target service module 116 may store the received public keys in memory (not shown) or external storage (not shown). When, for example, the key pairs expire, the target service module 116 may be notified and the target service module 116 may discard the public keys. The target service module 116 may store new, i.e., fresh, public keys when new key pairs are generated at the keystores and the public keys are distributed.

The procedure continues to step 320 and the target service module 116 applies each public key to a corresponding digital signature of the multi-signature token to generate a plurality of validation values. In this example, the first digital signature is generated using PrivateKey1. Further, PrivateKey1 and PublicKey1 together form a key pair. As such, PublicKey1 corresponds to the first digital signature and the target service module 116 applies PublicKey1 to the first digital signature to generate a first validation value. In an embodiment, applying PublicKey1 to the first digital signature comprises using PublicKey1 to decrypt the first digital signature to produce a first decrypted hash value that is the first validation value.

The second digital signature is generated using PrivateKey2. Further, PrivateKey2 and PublicKey2 together form a key pair. As such, PublicKey2 corresponds to the second digital signature and the target service module 116 applies PublicKey2 to the second digital signature to generate a second validation value. In an embodiment, applying PublicKey2 to the second digital signature comprises using PublicKey2 to decrypt the second digital signature to produce a second decrypted hash value that is the second validation value.

The procedure continues to step 325 and the target service module determines if all the validation values correlate to the received information. For this example, the first validation value is the first decrypted hash value. Further, the second validation value is the second decrypted hash value. In an embodiment, the target service module 116 may utilize the hash algorithm, which was used in the generation of the digital signatures as described above in relation to step 225 of FIG. 2, with the received information to generate a hash value at the target service module 116. For clarity, the hash value generated at the target service module 116 may be referred to as a target hash value.

The target service module 116 may compare the target hash value with each of the validation values to determine if the validation values correlate to the received information. Specifically, if a particular validation value (e.g., decrypted hash value from the multi-signature token) matches the target hash value, then the target service module 116 determines that the particular validation value correlates to the received information of the multi-signature token. For example, if the particular validation value matches the target hash value, then the target service module 116 determines that the received information of the multi-signature token likely was not unlawfully manipulated after the digital signature was generated (e.g., in transit to the target service module 116).

If a particular validation value (e.g., decrypted hash value from the multi-signature token) does not match the hash value, then the target service module 116 determines that the particular validation value does not correlate to the received information of the multi-signature token. For example, if the particular validation value does not match the target hash value, then the target service module 116 determines that the received information may have been unlawfully manipulated after the digital signature was generated (e.g., in transit to the target service module 116).

According to the one or more embodiments as described herein, the multi-signature token includes a plurality of digital signatures. Therefore, and if a cyber-attacker infiltrates a single keystore to unlawfully obtain a private key, the multi-signature token is still secure and protected such that a cyber-attacker cannot perform an unauthorized or unauthentic request by infiltrating a single keystore.

As an example, let it be assumed that a cyber-attacker infiltrates the first keystore to unlawfully obtain PrivateKey1. Armed with the unlawfully obtained PrivateKey1, the cyber-attacker may potentially be able to forge the first digital signature. However, the multi-signature token is still protected against cyber-attackers because of the inclusion of the second digital signature that is generated using a different private key that is based on a different implementation.

Therefore, and according to the one or more embodiments as described herein, the target service module 116 determines that the electronic communication is valid only if all of the validation values, each corresponding to a different private key that is based on a different implementation, correlates to the received information. Therefore, and in this example, the target service module 116 determines that all the validation values correlate to the received information if (1) the first decrypted hash value matches the target hash value and (2) the second decrypted hash value matches the target hash value. If either the first decrypted hash value or the second decrypted hash value do not match the target hash value, the target service module 116 determines that all the validation values do not correlate to the received information.

If all the validation values correlate to the received information at step 325, the procedure continues to step 330 and the target service module 116 determines that the multi-signature token is valid. If the multi-signature token is determined to be valid, the procedure may optionally proceed to step 335 and the target service module 116 may perform the request associated with the electronic communication.

If all the validation values do not correlate to the received information at step 325, the procedure continues to step 340 and the target service module 116 determines that the multi-signature token is invalid. If the multi-signature token is determined to be invalid, the procedure may optionally proceed to step 345 and the target service module 116 may deny performing the request associated with the electronic communication. The procedure then ends at step 350.

Figure 4:
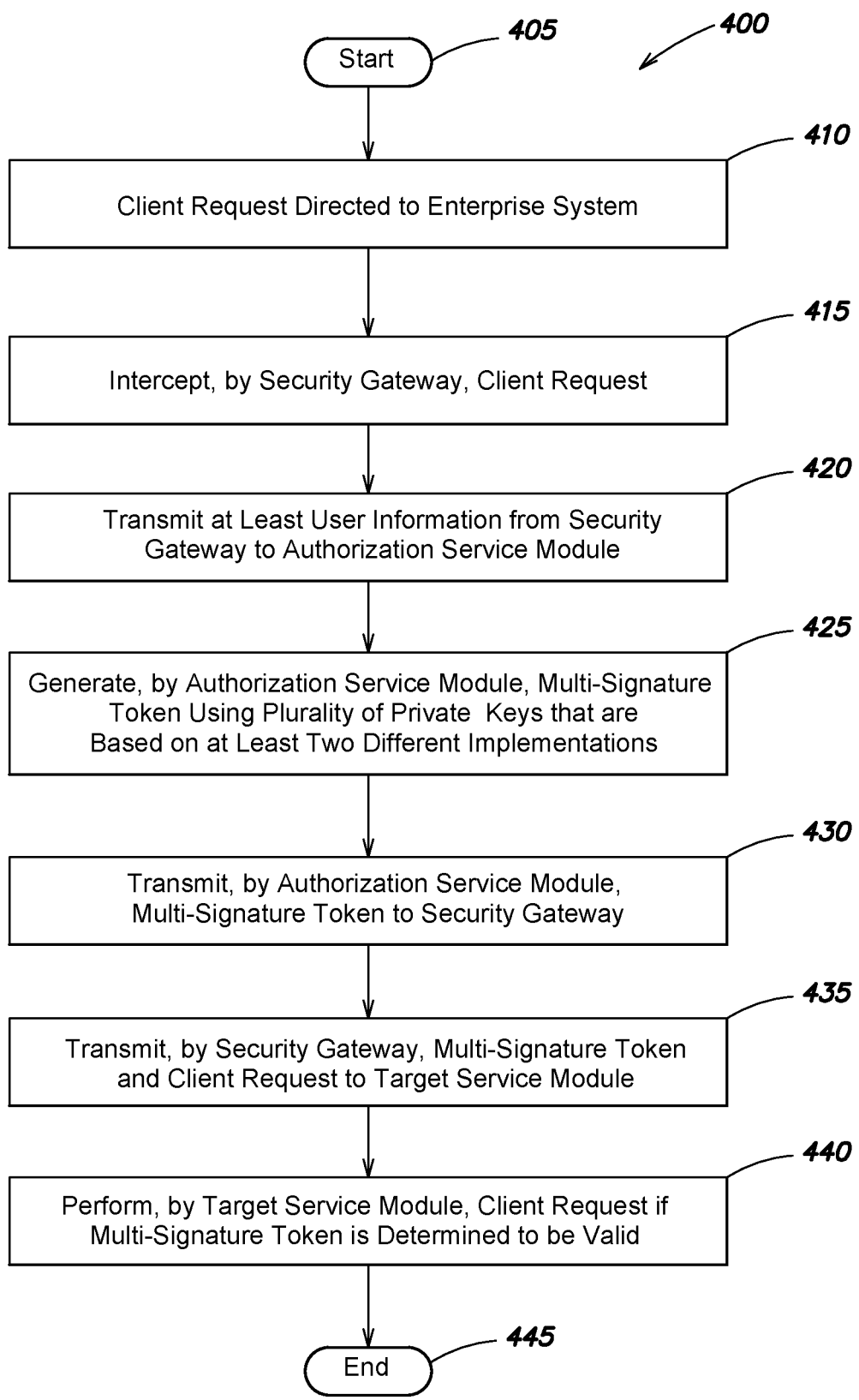
FIG. 4 is a flow diagram of a sequence of steps for generating and using a multi-signature token with the example system environment of FIG. 1 according to the one or more embodiments as described herein.

FIG. 4 is a flow diagram of a sequence of steps for generating and using a multi-signature token with the example system environment of FIG. 1 according to the one or more embodiments as described herein. The procedure starts at step 405 and continues to step 410 where a client request is directed to enterprise system 126. In an embodiment, a user operating client device 110 may issue the client request to enterprise system 126 over network 111. For this example, let it be assumed that a user John Doe, an employee of the enterprise that manages enterprise system 126, issues a client request to obtain financial analysis information. In an embodiment, the client request may be directed to the enterprise system 126 with a user identifier associated with the user that issued the request. Alternatively, the client request may be directed to the enterprise system 126 without the user identifier.

The procedure continues to step 415 and the security gateway 112 intercepts the client request. The procedure continues from step 415 to step 420. At step 420, the security gateway 112 transmits at least user information, corresponding to the user that issued the client request, to authorization service module 118. As described above in relation to step 215 of FIG. 2, the user information may include, but is not limited to, a user identifier of a user, a business context of the user, resource information indicating one or more resources (e.g., particular files, folders, devices, storage, etc.) that can be accessed by the user.

The procedure continues to step 425 and the authorization service module 118 generates a multi-signature token using a plurality of private keys that are based on at least two different implementations. In an embodiment, the authorization service module 118 may generate the multi-signature token in a similar manner as described above in relation to steps 220-230 of FIG. 2. As such, the multi-signature token includes at least the user information and a plurality of digital signatures that are generated using different private keys that are based on at least two different implementations.

The procedure continues to step 430 and the authorization service module 118 transmits the multi-signature token to security gateway 112. The procedure continues to step 435 and the security gateway 112 transmits the multi-signature token and the client request to the target service module 116. In an embodiment, the client request and multi-signature token may be transmitted together as a single electronic message, or the client request and multi-signature token may be transmitted separately. For example, when transmitted separately, the client request and multi-signature token may be transmitted serially.

The procedure continues to step 440 and the target service module 116 performs the client request if the multi-signature token is determined to be valid. In an embodiment, the target service module 116 may determine if the multi-signature token is valid or invalid in a similar manner as described above in relation to FIG. 3. If the multi-signature token is determined to be invalid in a similar manner as described above in relation to FIG. 3, the target service module 116 may deny performing the client request. The procedure then ends at step 445.

It should be understood that a wide variety of adaptations and modifications may be made to the techniques. For example, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computerized method for using a multi-signature access token for signature validation on a network, the method comprising:
    implementing, by a first keystore, a first security protocol to protect one or more first key pairs, wherein each of the one or more first key pairs includes a first private key and a first public key;
    implementing, by a second keystore, a second security protocol to protect one or more second key pairs, wherein each of the one or more second key pairs includes a second private key and a second public key, wherein the first security protocol and the second security protocol are different;
    generating, by an authorization service, a first signature by applying a selected first private key from the first keystore to information corresponding to an electronic request;
    generating, by the authorization service, a second signature by applying a selected second private key from the second keystore to the information;
    generating, by the authorization service, an access token that includes (1) the information, (2) the first signature, and (3) the second signature;
    determining that the electronic request is valid when (1) the first signature of the access token is validated, (2) the second signature of the access token is validated, and (3) a business context of a user that initiated the electronic request is consistent with a type of the electronic request, wherein the business context is one of a plurality of different business contexts; and
    determining that the electronic request is invalid when (1) the first signature of the access token is not validated, (2) the second signature of the access token is not validated, or (3) the business context of the user that initiated the electronic request is inconsistent with the type of the electronic request.

2. The computerized method of claim 1, wherein the information is user information that is assigned to the user that issues the electronic request and the user information includes one or more of a user identifier of the user, the business context of the user, and resource information indicating one or more resources that are accessible by the user.

3. The computerized method of claim 1, wherein the plurality of different business contexts for the user includes two or more of (1) a role, of a plurality of different roles, for the user at an enterprise, (2) access rights of the user in relation to one or more computer resources managed by the enterprise, and (3) privileges afforded to the user in relation to the one or more computer resources managed by the enterprise.

4. The computerized method of claim 3, wherein at least two selected roles, of the plurality of different roles, have different access rights or different privileges in relation to the one or more computer resources managed by the enterprise.

5. The computerized method of claim 1, wherein the type of the electronic request is a read data request or a write data request for data stored at a particular location in a file system hierarchy.

6. The computerized method of claim 1, further comprising:
    determining that the business context indicates that the user only has read access to data managed by an enterprise;
    determining, when the type of the electronic request is a read request, that the business context of the user that initiated the electronic request is consistent with the type of the electronic request; and
    determining, when the type of the electronic request is a write request, that the business context of the user that initiated the electronic request is inconsistent with the type of the electronic request.

7. The computerized method of claim 1, further comprising:
    determining that the business context indicates that the user has access to data stored at a particular location in a file system hierarchy managed by an enterprise;

determining, when the type of the electronic request is directed to the particular location, that the business context of the user that initiated the electronic request is consistent with the type of the electronic request; and determining, when the type of the electronic request is directed to a different location that is different from the particular location, that the business context of the user that initiated the electronic request is inconsistent with the type of the electronic request.

8. The computerized method of claim 1, further comprising:
generating a first validation value by applying a selected first public key, corresponding to the selected first private key, to the first signature;
determining that the first signature of the access token is validated when the first validation value correlates to the information;
generating a second validation value by applying a selected second public key, corresponding to the selected second private key, to the second signature; and
determining that the second signature of the access token is validated when the second validation value correlates to the information.

9. The computerized method of claim 1, further comprising:
performing an operation corresponding to the electronic request and for requested data in response to determining that the electronic request is valid; and
issuing an error message and declining to perform the operation for the requested data in response to determining that the electronic request is invalid.

10. A system for using a multi-signature access token for validation, the system comprising:
a memory;
a processor coupled to the memory;
a first keystore configured to implement a first protocol for protecting one or more first key pairs, wherein each of the one or more first key pairs includes a first private key and a first public key;
a second keystore configured to implement a second protocol for protecting one or more second key pairs, wherein each of the one or more second key pairs includes a second private key and a second pubic key;
a processor configure to execute one or more software modules, the one or more software modules configured to:
generate a first signature by applying a selected first private key from the first keystore to information corresponding to an electronic request;
generate a second signature by applying a selected second private key from the second keystore to the information;
generate an access token that includes (1) the information, (2) the first signature, and (3) the second signature;
determine that the electronic request is valid when (1) the first signature of the access token is validated, (2) the second signature of the access token is validated, and (3) a business context of a user that initiated the electronic request is consistent with a type of the electronic request, wherein the business context is one of a plurality of different business contexts, and
determine that the electronic request is invalid when (1) the first signature of the access token is not validated, (2) the second signature of the access token is not validated, or (3) the business context of the user that initiated the electronic request is inconsistent with the type of the electronic request.

11. The system of claim 10, wherein the information is user information that is assigned to the user that issues the electronic request and the user information includes one or more of a user identifier of the user, the business context of the user, and resource information indicating one or more resources that are accessible by the user.

12. The system of claim 10, wherein the plurality of different business contexts for the user includes two or more of (1) a role, of a plurality of different roles, for the user at an enterprise, (2) access rights of the user in relation to one or more computer resources managed by the enterprise, and (3) privileges afforded to the user in relation to the one or more computer resources managed by the enterprise.

13. The system of claim 12, wherein at least two selected roles, of the plurality of different roles, have different access rights or different privileges in relation to the computer resources managed by the enterprise.

14. The system of claim 10, wherein the type of the electronic request is a read data request or a write data request stored at a particular location in a file system hierarchy.

15. The system of claim 10, wherein the one or more software modules are further configured to:
determine that the business context indicates that the user only has read access to data managed by an enterprise;
determine, when the type of the electronic request is a read request, that the business context of the user that initiated the electronic request is consistent with the type of the electronic request; and
determine, when the type of the electronic request is a write request, that the business context of the user that initiated the electronic request is inconsistent with the type of the electronic request.

16. The system of claim 10, wherein the one or more software modules are further configured to:
determine that the business context indicates that the user has access to data stored at a particular location in a file system hierarchy managed by an enterprise;
determine, when the type of the electronic request is directed to the particular location, that the business context of the user that initiated the electronic request is consistent with the type of the electronic request; and
determine, when the type of the electronic request is directed to a different location that is different from the particular location, that the business context of the user that initiated the electronic request is inconsistent with the type of the electronic request.

17. The system of claim 10, wherein the one or more software modules are further configured to:
generate a first validation value by applying a selected first public key, corresponding to the selected first private key, to the first signature;
determine that the first signature of the access token is validated when the first validation value correlates to the information;
generate a second validation value by applying a selected second public key, corresponding to the selected second private key, to the second signature; and
determine that the second signature of the access token is validated when the second validation value correlates to the information.

18. The system of claim 10, wherein the one or more software modules are further configured to:

perform an operation corresponding to the electronic request and for requested data in response to determining that the electronic request is valid; and issue an error message and decline to perform the operation for the requested data in response to determining that the electronic request is invalid.

19. A computerized method for generating a multi-signature access token on a network for signature validation, the method comprising:

obtaining, over a computer network and by one or more software modules executed by a processor, a first private key of a first key pair and a second private key of a second private key pair, wherein the first key pair originates from a first keystore using a first security technique used to restrict access to the first key pair, wherein the second key pair originates from a second keystore using a second security technique used to restrict access to the second key pair;

generating, by the one or more software modules, a first signature by applying a first private key to information corresponding to an electronic request, wherein the first private key corresponds to a first key pair maintained at the first keystore;

generating, by the one or more software modules, a second signature by applying a second private key to the information, wherein the second private key corresponds to a second key pair maintained at a second keystore; and generating, by the one or more software modules, an access token that includes (1) the information, (2) the first signature, and (3) the second signature, wherein the information is used with the first signature and second signature to whether determine whether the electronic request is authorized or unauthorized.

20. The computerized method of claim 19, further comprising:

denying performance of the electronic request when the first signature is valid, the second signature is valid, and an access privilege of a user that initiates the electronic request is inconsistent with a type of the electronic request.

* * * * *